United States Patent
Kim et al.

(10) Patent No.: US 7,245,661 B2
(45) Date of Patent: Jul. 17, 2007

(54) TRANSCODER AND METHOD OF TRANSCODING

(75) Inventors: Tae-hee Kim, Seoul (KR); Byung-sun Choi, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 714 days.

(21) Appl. No.: 10/320,528

(22) Filed: Dec. 17, 2002

(65) Prior Publication Data

US 2003/0118111 A1 Jun. 26, 2003

(30) Foreign Application Priority Data

Dec. 18, 2001 (KR) ................ 2001-80812

(51) Int. Cl.
*H04N 7/12* (2006.01)
*G06K 9/36* (2006.01)
(52) U.S. Cl. ............... 375/240.16; 375/240.12; 382/236
(58) Field of Classification Search ........... 375/240.12, 375/240.16, 240.03, 240.13, 240.15; 725/93; 382/236, 238
See application file for complete search history.

(56) References Cited

U.S. PATENT DOCUMENTS

| 5,889,561 | A | * | 3/1999 | Kwok et al. | 375/240.03 |
|---|---|---|---|---|---|
| 6,058,143 | A | * | 5/2000 | Golin | 375/240.16 |
| 6,434,196 | B1 | * | 8/2002 | Sethuraman et al. | 375/240.12 |
| 6,993,075 | B2 | * | 1/2006 | Kim et al. | 375/240.12 |
| 2003/0009764 | A1 | * | 1/2003 | Krishnamachari | 725/93 |
| 2003/0081676 | A1 | * | 5/2003 | Lin et al. | 375/240.12 |

* cited by examiner

*Primary Examiner*—Gims Philippe
(74) *Attorney, Agent, or Firm*—Staas & Halsey LLP (57) ABSTRACT

A transcoder and a method of transcoding which reduces computational requirements without picture deterioration. A mode decision unit decides a mode of a scaled output macro block based on an area of the scaled macro block overlapped with a non-scaled macro block of a reference frame and a mode of the overlapped macro block. A motion vector decision unit decides a reference motion vector of the output macro block based on a motion vector with respect to the overlapped macro blocks. A picture quality preference mode selection unit receives a user picture quality preference command. A motion vector compensation unit compensates the motion vector of the output macro block based on the decided reference motion vector and the picture quality preference command.

16 Claims, 10 Drawing Sheets

Football
PSNR-dB

| Scale | Method | 0.5M | 1M | 1.5M | 2M | 2.5M | 3M | 3.5M | 4M | 4.5M | 5M | 5.5M | 6M |
|---|---|---|---|---|---|---|---|---|---|---|---|---|---|
| 0.75 | Re-encoding | NA | 26.956 | 29.386 | 31.389 | 32.848 | 34.024 | 35.038 | 35.923 | 36.711 | 37.421 | 38.062 | 38.646 |
|  | Fast Mode | NA | 26.727 | 29.201 | 31.081 | 32.529 | 33.698 | 34.709 | 35.599 | 36.387 | 37.100 | 37.754 | 38.351 |
|  | (Difference) | NA | -0.229 | -0.185 | -0.308 | -0.319 | -0.326 | -0.329 | -0.324 | -0.324 | -0.321 | -0.308 | -0.295 |
|  | Re-use | NA | 26.247 | 28.515 | 30.288 | 31.716 | 32.882 | 33.890 | 34.788 | 35.591 | 36.309 | 36.978 | 37.592 |
|  | (Difference) | NA | -0.709 | -0.871 | -1.101 | -1.132 | -1.142 | -1.148 | -1.135 | -1.120 | -1.112 | -1.084 | -1.054 |
| 0.5 | Re-encoding | NA | 29.826 | 32.123 | 33.867 | 35.306 | 35.537 | 37.603 | 38.557 | 39.404 | 40.185 | NA | NA |
|  | Fast Mode | NA | 29.237 | 31.803 | 33.602 | 35.075 | 36.345 | 37.435 | 38.392 | 39.245 | 40.005 | NA | NA |
|  | (Difference) | NA | -0.389 | -0.320 | -0.265 | -0.231 | -0.192 | -0.168 | -0.165 | -0.159 | -0.180 | NA | NA |
|  | Re-use | NA | 28.901 | 31.235 | 33.041 | 34.528 | 35.816 | 36.932 | 37.922 | 38.800 | 39.591 | NA | NA |
|  | (Difference) | NA | -0.925 | -0.888 | -0.826 | -0.778 | -0.721 | -0.671 | -0.635 | -0.604 | -0.594 | NA | NA |
| 0.375 | Re-encoding | 29.412 | 33.291 | 35.805 | 37.716 | 39.264 | 40.606 | 41.730 | NA | NA | NA | NA | NA |
|  | Fast Mode | 28.975 | 32.853 | 35.443 | 37.373 | 38.932 | 40.226 | 41.363 | NA | NA | NA | NA | NA |
|  | (Difference) | -0.437 | -0.438 | -0.362 | -0.343 | -0.332 | -0.380 | -0.367 | NA | NA | NA | NA | NA |
|  | Re-use | 28.411 | 32.241 | 34.854 | 36.841 | 38.442 | 39.779 | 40.937 | NA | NA | NA | NA | NA |
|  | (Difference) | -1.001 | -1.050 | -0.951 | -0.875 | -0.822 | -0.827 | -0.793 | NA | NA | NA | NA | NA |

FIG. 9

| | A | B | C | D | E | F |
|---|---|---|---|---|---|---|
| Avg.PSNR(dB) | 32.24 | 32.03 | 32.11 | 32.02 | 31.92 | 32.01 |
| Note | re-encoding | re-encoding (but all MB's motion_type is MC_FRAME) | Fast Mode (but full search Mode fast ME) | Fast Mode (but full search ME) | Fast Mode | Fast Mode (but full search ME and all MB's motion_type is MC_FRAME) |

TRANSCODER AND METHOD OF TRANSCODING

CROSS REFERENCE TO RELATED APPLICATIONS

This application claims the benefit of Korean Patent Application No. 2001-80812 filed Dec. 18, 2001, in the Korean Industrial Property Office, the disclosure of which is incorporated herein by reference.

BACKGROUND OF THE INVENTION

1. Field of the Invention

The present invention relates to a transcoder and a method of transcoding, and more particularly to a transcoder for deciding a mode and a motion vector in a transcoding mode and a method of deciding a motion vector in a transcoding mode.

2. Description of the Related Art

A motion picture signal has a vast amount of data, thus data is transmitted or recorded after compression coding the motion picture signal and converting the motion picture signal into a bit stream. As one compression coding method, International Standards Organization (ISO) 11172 Motion Picture Experts Group (MPEG) is usually used.

Figure 1:
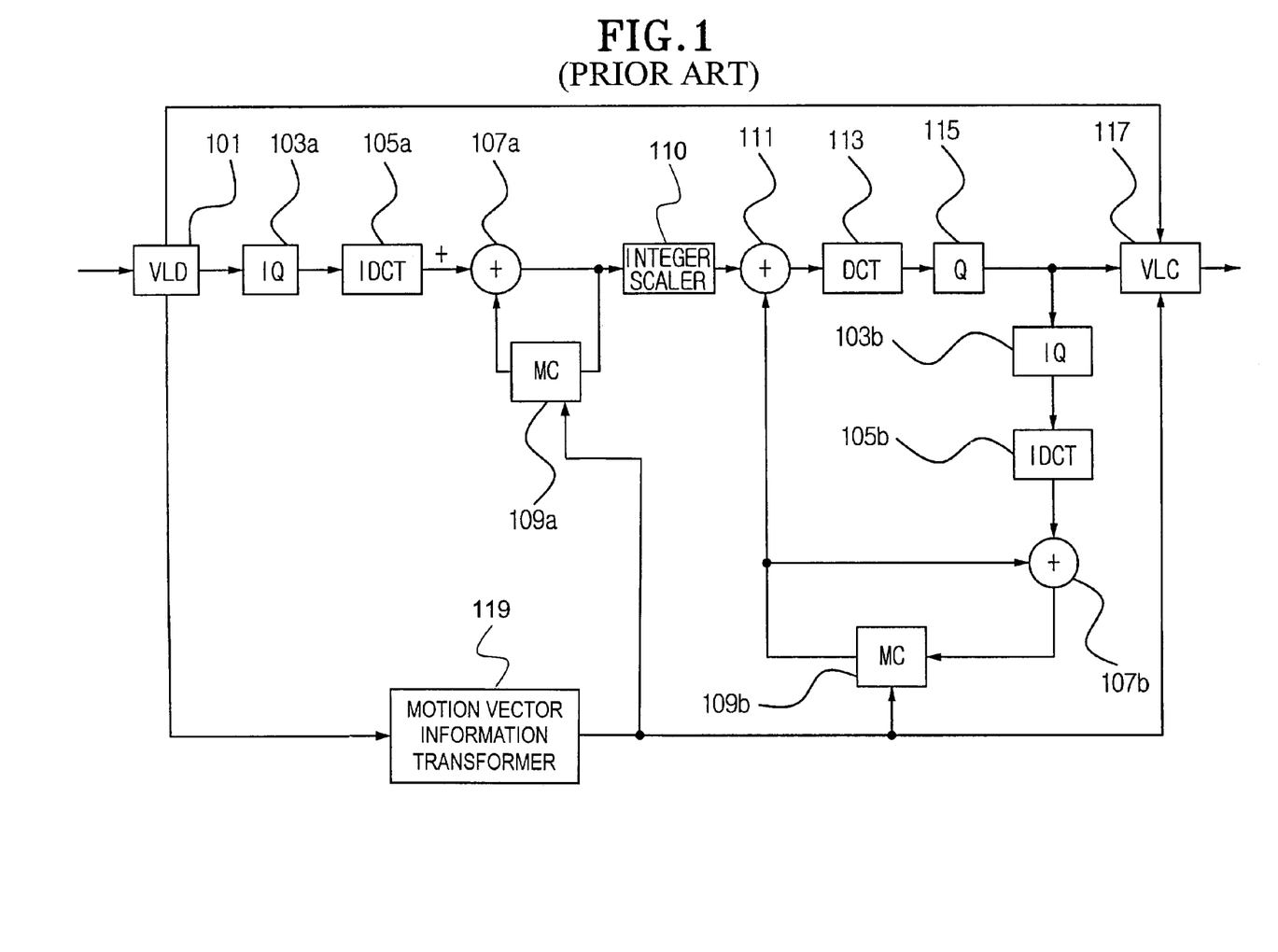
FIG. 1 is a block diagram of a conventional transcoder.

FIG. 1 is a block diagram of a conventional transcoder. Referring to FIG. 1, the conventional transcoder comprises a VLD (variable length decoder) 101, IQs (inverse quantizers) 103a and 103b, IDCTs (inverse discrete cosine transformers) 105a and 105b, adders 107a and 107b, MCs (motion compensators) 109a and 109b, a subtractor 111, a DCT (discrete cosine transformer) 113, a quantizer 115, a VLC (variable length coder) 117, and a motion vector information transformer 119.

The VLD 101 reduces an entire amount of data flow by marking frequently generated data as a short sign and data not frequently generated as a relatively long sign. As an I picture, the VLD 101 reduces a considerable amount of bits in a picture that is constructed with only DCT coefficients. The VLD 101 performs Huffman coding for further reducing the amount of the bits.

The IQ 103a inverse quantizes the DCT coefficients coded by the VLD 101. The IQ 103a transmits the inverse quantized DCT coefficients to the IDCTs 105a. The IDCT 105a provides an estimation error signal, which is gained by inverse DCT converting the inverse quantized DCT coefficients, to the adder 107a. The adder 107a adds the estimation error signal input to the adder 107a and an MC estimation signal provided by the MC 109a. The 'estimation' means calculating a difference of pixel data between a frame and a field. In other words, a macro block having a best match data on a current frame and field and a macro block on a preceding frame and field is searched for, and a motion direction of the searched for macro block is detected by a motion vector.

From the input motion vector, the MC 109a estimates the motion compensation from the preceding frame or plural preceding frames by the order of coding, and transmits the MC estimation signal to the adder 107a. The adder 107a adds the input estimation error signal and the MC estimation signal, and transmits the added signal to the subtractor 111 via the integer scaler 110. The subtractor 111 subtracts a second MC estimation signal from the scaled estimation error signal, and provides a resulting estimation error signal as an input to the DCT 113. The DCT 113 DCT converts the input estimation error signal, and provides the gained DCT coefficients to the quantizer 115. The quantizer 115 quantizes the input DCT coefficients. The quantizer 115 provides the quantized DCT coefficients to the VLC 117 and at the same time to the IQ 103b. The IQ 103b inverse quantizes the input DCT coefficients. The IQ 103b provides the inverse quantized DCT coefficients to the IDCT 105b. The IDCT 105b inverse DCT converts the input DCT coefficients, and provides an estimation error signal as an input to the adder 107b. The adder 107b adds the input estimation error signal and the estimation signal, and provides the gained signal to the MC 109b. From the input motion vector, the MC 109b estimates the motion compensation from the preceding frame or the plural preceding frames by the order of the coding. That is, the MC 109b calculates an input motion vector with respect to consecutively input images, i.e., frames, and estimates a motion compensation based on the calculated motion vector. The order of the coding means an order of the input image signals being processed by the MC 109b. The MC 109b provides the gained estimation signal to the subtractor 111 and at the same time to the adder 107b. The VLC 117 variable length codes the input picture coding type, the motion vector, and the quantized DCT coefficients, and outputs a gained bit stream. The motion vector information transformer 119 transforms a value (MOTION VECTOR INFORMATION) provided by the VLD 101 to an appropriate form useable by a coder.

Figure 2A:
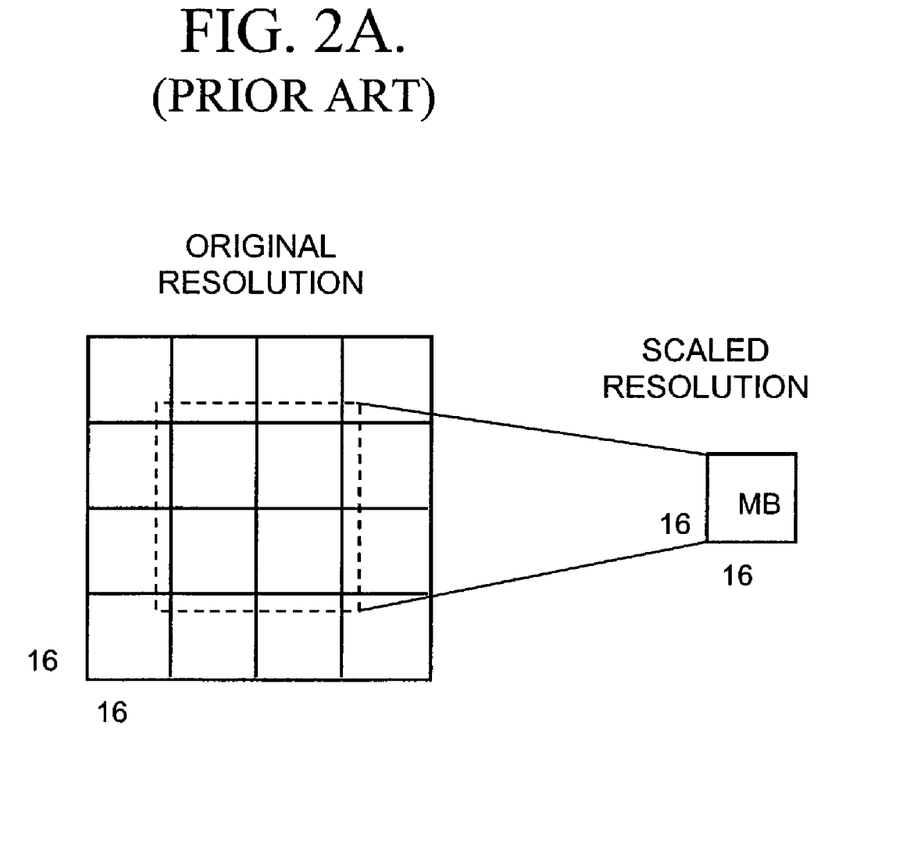
FIG. 2A is a view showing a problem of transcoding according to the transcoder shown in FIG. 1 where scaling non integral multiples.
Figure 2B:
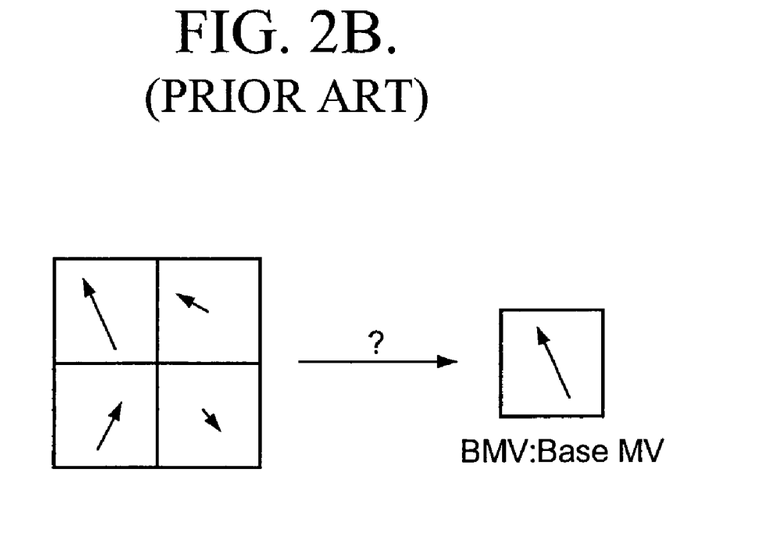
FIG. 2B is a view showing another problem of the transcoding according to the conventional method.
Figure 3:
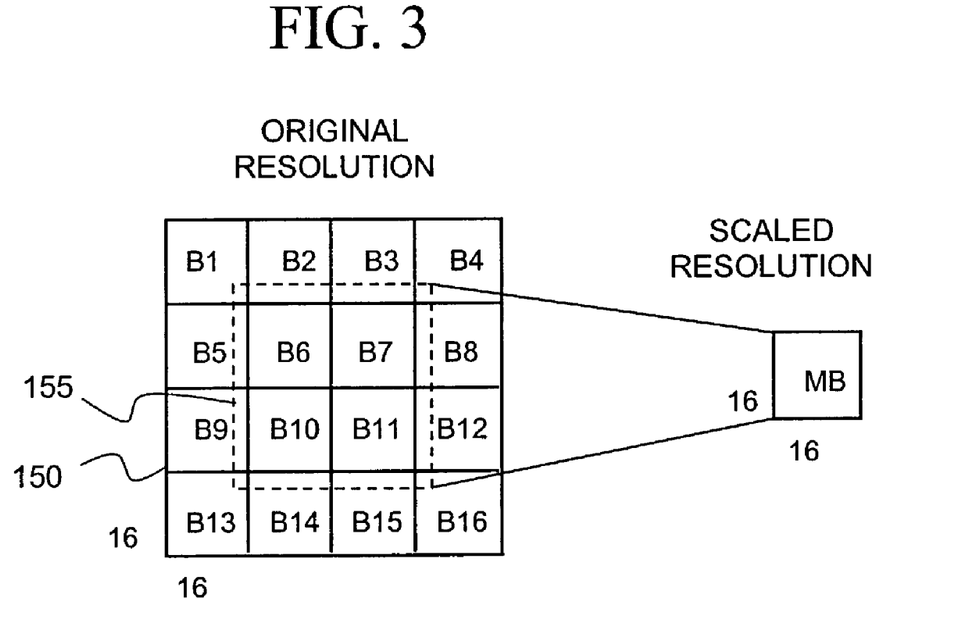
FIG. 3 is a view for explaining terms used in the description of the present invention.

However, the conventional transcoder only supports for scaling 2N multiples or integral number multiples to re-use the motion vector from the input bit stream. Therefore, since the conventional transcoder, as shown in FIG. 2, does not consider scaling of non-integral number multiples, there is a shortcoming that the conventional transcoder is not suitable for an application of the transcoder that supports various resolutions. In addition, as shown in FIG. 3, the conventional transcoder considers only the motion vector in a motion estimation to reduce computational complexities, but does not consider computational requirements for deciding a macro block mode, thus application of the conventional transcoder is limited.

SUMMARY OF THE INVENTION

The present invention has been made to overcome the above-mentioned problem of the related art. Accordingly, it is the object of the present invention to provide an improved transcoder and a method of transcoding method which scales an input bit stream having a motion estimation in a block unit like Motion Picture Experts Group MPEG-2 and which reduces computational requirements based on considering a motion vector and a macro block mode determination, and maintains an image quality without deterioration.

Additional objects and advantages of the invention will be set forth in part in the description which follows, and, in part, will be obvious from the description, or may be learned by practice of the invention.

The above and/or other objects of the present invention are accomplished by a transcoder, comprising: a mode decision unit which decides a mode of a macro block of an output bit stream based on an area of a macro block overlapped with a reference frame among input macro blocks and a mode of the overlapped macro block; and a motion vector decision unit which decides a reference motion vector of the output macro block based on a motion vector with respect to the overlapped macro blocks.

The mode decision unit multiplies areas of the overlapped macro blocks and weight values corresponding to the respective overlapped macro blocks, and decides the mode of the output macro block as an intra where the proportion of the intra in a summation of resultant values obtained by multiplying the areas and weight values is above a predetermined value, and the weight value is a ratio of the areas of the overlapped macro blocks with respect to an entire area of the an input macro block.

The mode decision unit comprises a motion type decision unit which decides a motion type of the output macro block based on a motion type of the input macro block. The motion type decision unit decides the motion type of the output macro block as a field, where the motion types of the overlapped macro blocks are all fields and values of the motion vector corresponding to the respective fields are all the same.

The motion vector decision unit decides a reference motion vector of the output macro block by a following mathematical expression based on a ratio of the area of the macro block overlapped with the reference frame among the input macro blocks and the motion vector:

$$BMV_i = \sum_{m=0}^{M} MV_m w_m \times sf$$

where: $BMV_i$ is an ith reference motion vector of the output macro block, i=0, 1, ..., MB_horizontal size×MB_vertical size-1, $MV_m$ is an mth motion vector with respect to the overlapped macro block, $w_m$ is a weight value with respect to the mth motion vector;

sf is a value for deciding a size (0<sf<1) of an image of an output bit stream, and MB is an area of the overlapped macro block.

The motion vector decision unit adds +1 (pixel unit) to an even field motion vector, where the even field motion vector of the output macro block is based on an odd field motion vector of the reference frame, if the motion type of the output macro block is decided to be a field.

The motion vector decision unit subtracts −1 (pixel unit) from an overlapped odd field motion vector, where the odd field motion vector of the output macro block is based on the even field motion vector of the reference frame, if the motion type of the output macro block is decided to be a field.

The above and other objects of the invention are also accomplished by providing a method of transcoding, comprising: deciding a mode of a macro block of an output bit stream based on an area of a macro block overlapped with a reference frame among input macro blocks and a mode of the overlapped macro block; and deciding a reference motion vector of the output macro block based on a motion vector with respect to the overlapped macro blocks.

BRIEF DESCRIPTION OF THE DRAWINGS

The above and other objects and features of the present invention will be more apparent by describing preferred embodiments of the present invention by referring to the accompanying drawings, in which.

DESCRIPTION OF THE PREFERRED EMBODIMENTS

Reference will now be made in detail to the present embodiments of the present invention, examples of which are illustrated in the accompanying drawings, wherein like reference numerals refer to like elements throughout.

In the present invention, a motion estimation obtains a pixel data difference between adjacent frames (fields) using a correlation between the adjacent frames (fields). That is, the motion estimation estimates a motion of a macro block of a next frame by comparing a current frame with a previous frame, searching a macro block of the previous frame that corresponds to a predetermined macro block of the current frame, detecting a motion vector of the searched macro block of the previous frame and estimating the motion of the macro block of the next frame based on such detected motion vector. A reference frame as used herein refers to a previous frame with which a current frame is being compared.

Referring now to FIG. 3, a reference frame 150, of original resolution has a number of associated non-scaled macro blocks B1 through B16, A scaled macro block 155 of the currently input frame is indicated by dashed lines which are superimposed on the squares B1 through B16. The area of the scaled macro block 155 which corresponds to at least a portion of one of the non-scaled macro blocks is said to overlap the non-scaled macro block. Thus, the scaled macro block 155 completely overlaps the non-scaled macro blocks B6, B7, B10 and B11 and partially overlaps the non-scaled macro blocks B1, B2, B3, B4, B5, B8, B9, B12, B13, B14, B15 and B16.

Figure 4:
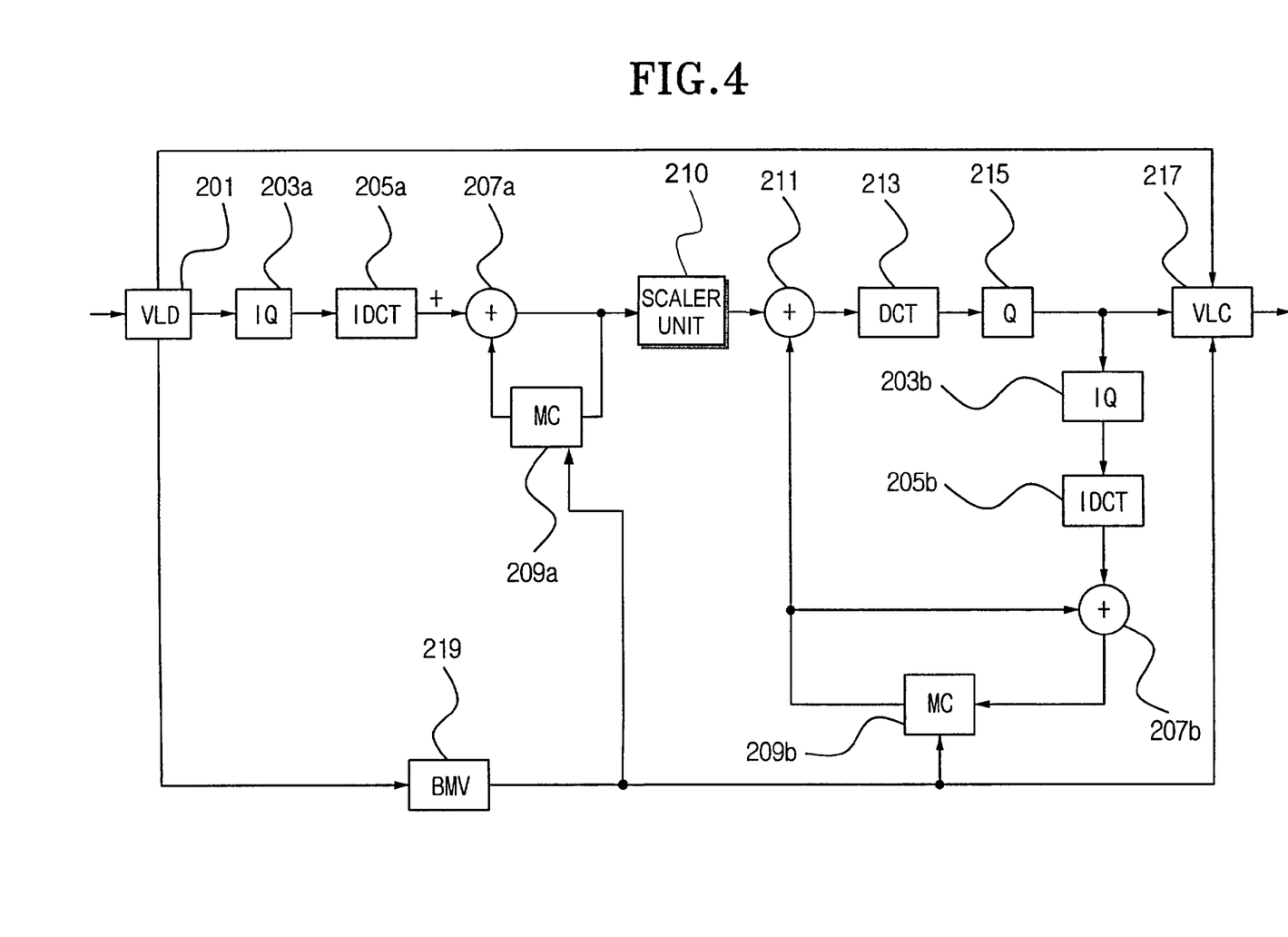
FIG. 4 is a view schematically showing a transcoder according to the present invention.
Figure 5:
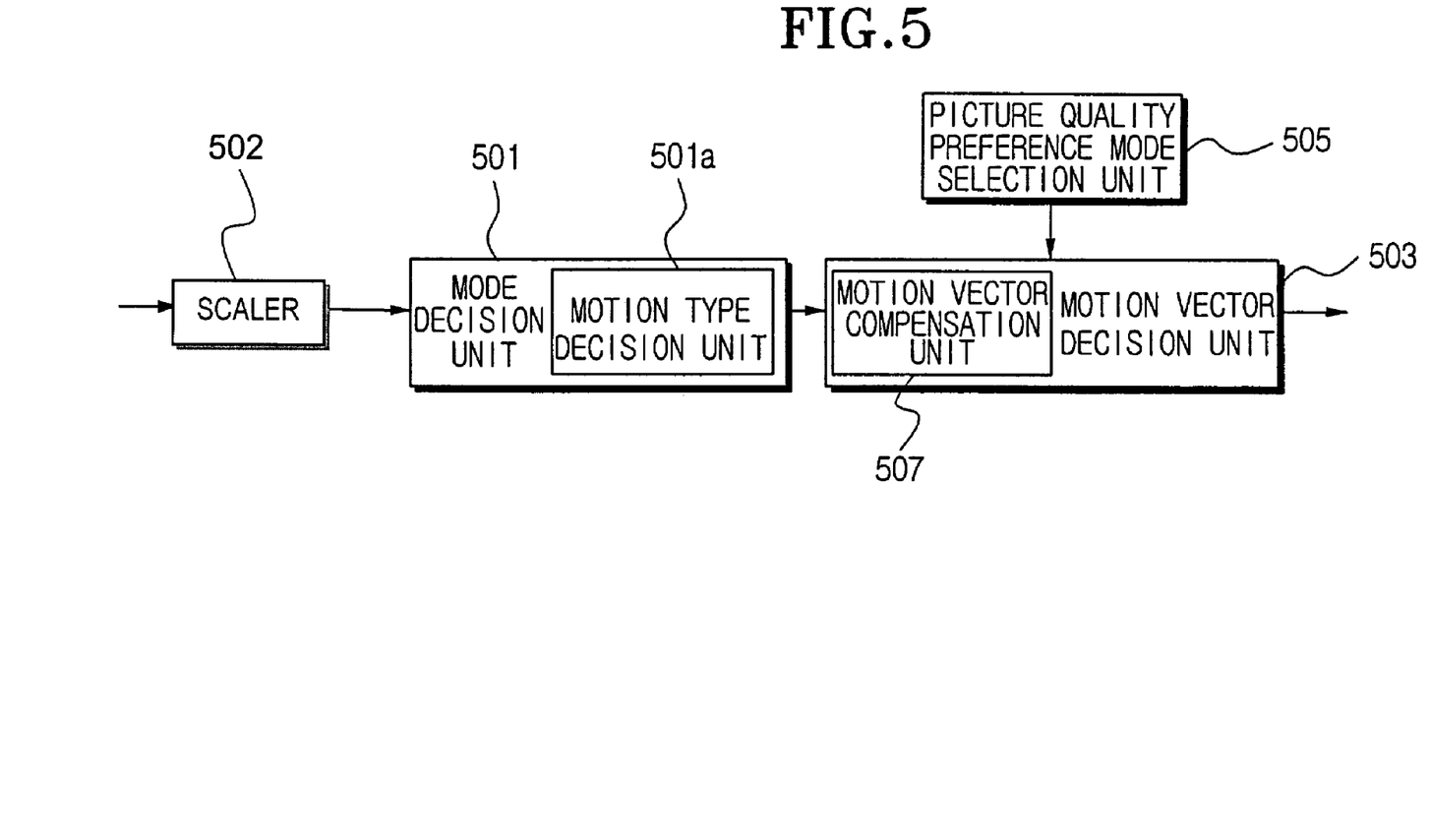
FIG. 5 is a block diagram to describe a move estimation performed by the transcoder of FIG. 4.

FIG. 4 is a view schematically showing a transcoder according to the present invention. FIG. 5 is a block diagram to describe a motion estimation performed by the transcoder of FIG. 4.

Referring to FIGS. 4 and 5, the transcoder comprises a VLD 201, IQs 203a and 203b, IDCTs 205a and 205b, adders 207a and 207b, MCs 209a and 209b, a scaler unit 210, a subtractor 211, a DCT 213, a quantizer 215, a VLC 217, and a BMV (base motion vector) 219. The structure and the operation of each of the VLD 201, the IQs 203a and 203b, the IDCTs 205a and 205b, the adders 207a and 207b, the MCs 209a and 209b, the subtractor 211, the DCT 213, the quantizer 215 and the VLC 217 is the same as the structure and operation of the corresponding conventional VLD 101, IQs 103a and 103b, IDCTs 105a and 105b, adders 107a and 107b, MCs 109a and 109b, subtractor 111, DCT 113, quantizer 115 and VLC 117, respectively, thus the description of the structure and the operation of the above elements will not be repeated.

In the transcoder according to the present invention, the scaler unit 210 comprises a mode decision unit 501, a motion type decision unit 501a, a scaler 502 a motion vector decision unit 503, a picture quality preference mode selection unit 505, and a motion vector compensation unit 507, as shown in FIG. 5.

The mode decision unit 501 decides a mode of a macro block of an output bit stream based on areas of scaled macro blocks overlapped with non-scaled macro blocks of a reference frame and modes of the overlapped macro blocks. At this point, the mode of the macro block is referred to as a mode of an image signal input in a bit stream, i.e., an Intra coding mode, a Predictive coding mode, and a Bidirectionally Predictive coding mode. Also, the mode of the macro block includes information on whether the image signal input when the motion vector is estimated is a frame vector or a field vector, and if the input image is a frame vector, whether the field is a top field or a bottom field.

The mode decision unit 501 multiplies the areas of the overlapped macro blocks and a weight value corresponding to the overlapped macro blocks. The mode decision unit 501 decides the mode of output macro block as an intra coding mode, when a proportion of the intra in a summation of resultant values from multiplying is above a predetermined value (for example, the proportion of the intra is more than 25% in the case of 0.5 scaling). Here, the weight value is a ratio of the areas of the respective overlapped non-scaled macro blocks with respect to an entire area of the scaled macro block of the reference frame.

The motion type decision unit 501a decides a motion type of the output macro block based on a motion type of the input macro block. The motion type decision unit 501a decides the motion type of the output macro block as field, where the motion types of the overlapped macro blocks are all fields and the values of the motion vectors corresponding to the respective fields are the same.

The motion vector decision unit 503 decides a reference motion vector of the output macro block based on the motion vector with respect to the overlapped macro blocks. The picture quality preference mode selection unit 505 receives a picture quality preference command from a user. Where the picture quality preference command is transmitted through the picture quality preference mode selection unit 505, the motion vector compensation unit 507 compensates the motion vector of the output macro block based on the decided reference motion vector. The decided motion vector is transmitted to the motion vector compensation unit 507. The motion vector compensation unit 507 receives the motion vector decided by the motion vector decision unit 503 and performs a research ±2 or ±1 (pixel unit) and a refinement of a half pixel unit.

The scaler 502 scales an input image. That is, the scaler 502 varies a decoded image signal in size to a desired proportion. The BMV 219 detects a reference motion vector from the macro block of the input bit stream and provides the reference motion vector to the MC's 209 and 209b and the VLC 217. The reference motion vector detected by the BMW 219 is used as a reference point for the signal process performed by the MC 209b and the VLC 217.

Figure 6:
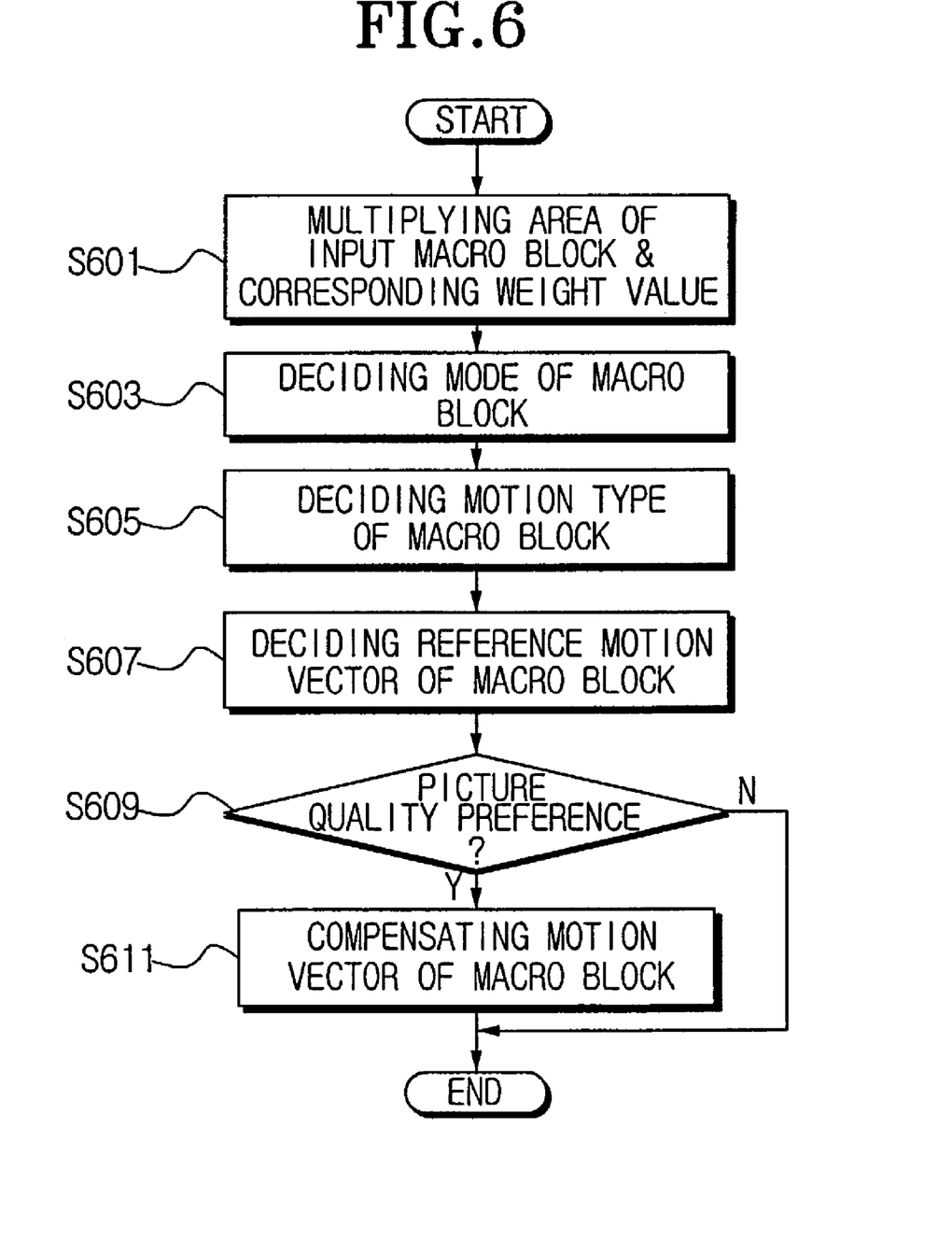
FIG. 6 is a flow chart showing a method of transcoding using the transcoder according to FIG. 5.

FIG. 6 is a flow chart showing a transcoding method according to FIG. 5. Referring to FIG. 6, the operation of the transcoder according to the present invention will be described.

When the bit stream is input to be transcoded, the mode decision unit 501 compares the scaled macro blocks of the input bit stream with non-scaled macro blocks and decides the mode of the macro block of the output bit stream based on the respective areas of the overlapped macro blocks and the respective modes of the overlapped macro blocks. See FIG. 3 and the description thereof concerning the meaning of the term overlapped macro block. Here, the mode decision unit 501 multiplies the respective areas of the overlapped macro blocks and the weight value corresponding to the overlapped macro blocks (S 601). With reference to FIG. 3, the weight value corresponding to the overlapped macro block means the weight value corresponding to each macro block within the region 155 indicated by dashed lines. The mode decision unit 501 adds the multiplied results and decides the mode of the output macro block as the intra, when the proportion of the intra in a summation of resultant values from multiplying is above a predetermined value (S 603). The output macro blocks may have an intra mode or an inter mode. The proportion of the intra in the summation of resultant values refers to the proportion of the intra to the overlapped macro blocks existing within the region 155 in FIG. 3. The mode decision unit 501 decides the mode of the output macro block as an inter, when the proportion of the intra in a summation of resultant values from multiplying is below a predetermined value (S 603). At this time, the weight value means the ratio of the area of each overlapped macro block with respect to the entire area of the input macro block. The weight value may be obtained by the following mathematical expressions (1), (2) and (3).

$$S = \text{Width of macro block} \times \text{Height of macro block} \quad (1)$$

$$S = \sum_{m=0}^{M} S_m \quad (2)$$

$$W = \sum_{m=0}^{M} W_m = \sum_{m=0}^{M} \frac{S_m}{S} = 1 \quad (3)$$

Where, 'S' is the area of the macro block, '$S_m$' is the area of the overlapped macro block, M is a number of scaled macro blocks, '$W_m$' is a weight value corresponding to an area of an overlapped macro block, and 'W' is a sum of the weight values.

The motion type decision unit 501a decides the motion type of the output macro block based on the motion type of the macro block of the input bit stream (S 605). Here, the motion type decision unit 501a is realized to decide the motion type of the output macro block as the field, when the motion type of the macro block overlapped with the reference frame of the input bit stream is the mode field and the values of the motion vector corresponding to each of the fields are all the same. Moreover, the motion type decision unit 501a decides the motion type of the output macro block as the frame except the case that the motion type of the macro block is decided as the field by the above method.

The motion vector decision unit 503 decides the reference motion vector of the output macro block based on the motion vector with respect to the overlapped macro blocks (S 607). The motion vector decision unit 503 decides the reference motion vector of the output macro block by mathematical expression (4) based on the ratio of the area and the motion vector of the respective macro block overlapped with the reference frame among the input macro blocks.

$$BMV_i = \sum_{m=0}^{M} MV_m w_m \times sf \quad (4)$$

Here, 'BMV$_i$' is an ith reference motion vector of the output macro block, 'i' is 0, 1, . . . , MB_horizontal size×MB_vertical size −1, 'MV$_m$' is an mth motion vector with respect to the overlapped macro blocks; 'w$_m$' is a weight value with respect to the mth motion vector; 'sf' is a value for deciding an image size of the output bit stream, the value of sf is 0<sf<1; and 'MB' is the area of the overlapped macro block.

The picture quality preference mode selection unit 505 receives the picture quality preference command from a user. Where the picture quality preference command is transmitted through the picture quality preference mode selection 505 (S 609), the motion vector compensation unit 507 compensates the motion vector of the output macro block based on the decided reference motion vector (S 611). In this case, the motion vector compensation unit 507 calculates a motion vector initial value for compensating the motion vector of the output macro block by mathematical expressions (5a) and (5b) based on the reference motion vector decided by the motion vector decision unit 501.

$$init\_mvx = BMV[r][s][0]/2 \quad (5a)$$

$$init\_mvy = BMV[r][s][1]/2 \quad (5b)$$

| Meaning of Indices in BMV[r] [s] [t] | | |
|---|---|---|
| | 0 | 1 |
| r | First vector in MB | Second vector in MB |
| s | Forward motion | Backward motion |
| t | Horizontal | Vertical |

In expression (5a), 'init_mvx' is an x value of the motion vector initial value, and in expression (5b), 'init-mvy' is a y value of the motion vector initial value, and 'BMV' is the decided reference motion vector.

Since the motion vector is the half pixel unit, when the reference motion vector is divided by 2, the motion vector initial value is the pixel unit. In this case, the motion vector initial value means a center value of a motion search area meeting the conditions of mathematical expressions (6a), (6b), (6c) and (6d).

$$sx = sy = 2(\pm 2 \text{ or } \pm 1 \text{ pixel}) \quad (6a)$$

$$sx + |init\_mvx| > sxdec, sx = sxdec - |init\_mvx| \quad (6d)$$

$$sy + |init\_mvy| > sydec, sy = sydec - |init\_mvy| \quad (6c)$$

$$(sxdec |init\_mvx|, sydec |init\_mvy|) \quad (6d)$$

Here, 'sx' and 'sy' is the motion vector search area in encoding, 'sxdec' and 'sydec' are decided values from 'f_code[s][t]' in the bit stream input to a decoder. In this case, 'f_code' is a parameter defined in 'MPEG-1' and 'MPEG-2', the value of the 'f_code' has a range of one to seven under 'MPEG-1', and a range of one to nine under 'MPEG-2'.

Figure 7A:
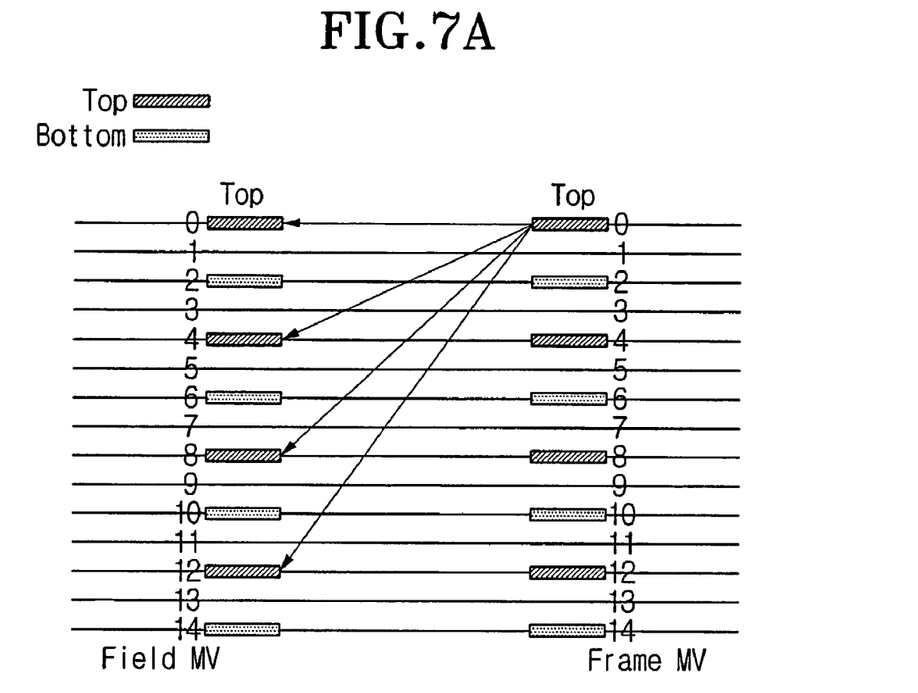
FIGS. 7A through 7D are views showing an example of a method of compensating a motion vector of a macro block.
Figure 7B:
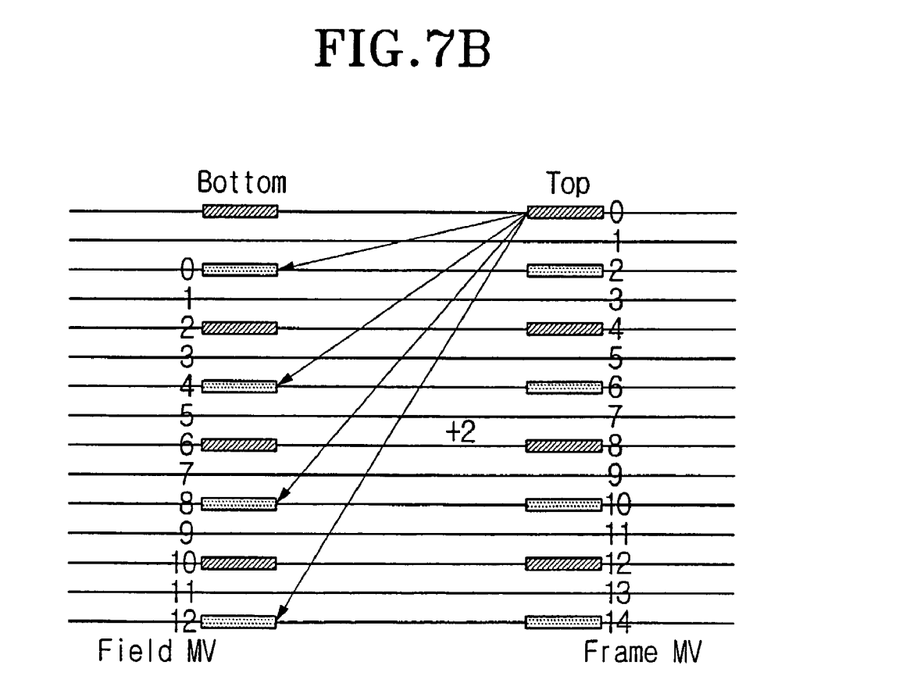
Figure 7C:
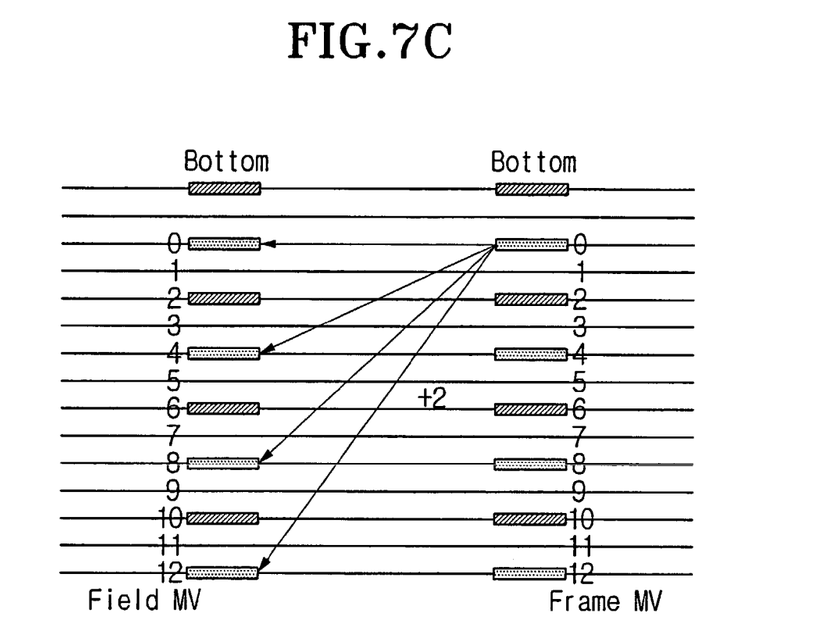
Figure 7D:
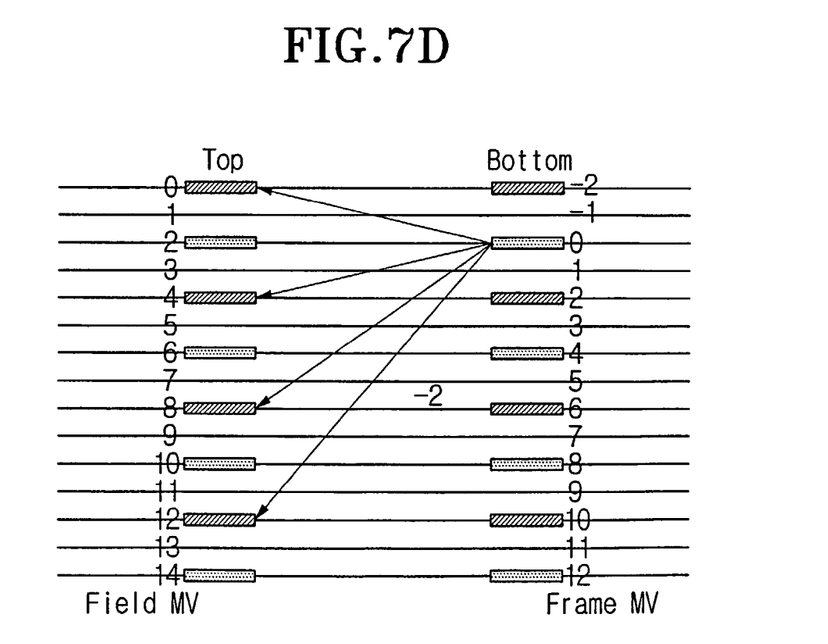

In the case of interlaced video, sometimes, the mode of the macro block currently decided and output and the information of the motion vector in the input macro block of the corresponding area are not coincided. To overcome the above phenomenon, the motion vector decision unit 503 compensates the output motion vector. A method of compensating the motion vector of the macro block is shown in FIGS. 7A through 7D by way of example. The right sides of the FIGS. 7A through 7D indicate each field of the macro block, and the left sides indicate each field of the reference frame. For example, when it is decided that the motion type of the output macro block is the field, the motion vector decision unit 503 adds +2 (half pixel unit) to an even field motion vector of the output macro block (FIG. 7B), in the case that the even field motion vector of the output macro block is based on an odd field motion vector of a reference frame (FIG. 7A). Moreover, when the motion type of the output macro block is decided as the field, the motion vector decision unit 503 adds −2 (half pixel unit) to the odd field motion vector of the output macro block (FIG. 7D), in the case that the odd field motion vector of the output macro block is based on the even field motion vector of the reference frame (FIG. 7C). Here, the value +2 or −2 is the value set up by a general phase difference value between the even/odd field of the reference frame and the odd/even field of the output macro block. The compensated motion vector is transmitted to the motion vector compensation unit 507. After the motion vector compensation unit 507 receives the motion vector compensated by the motion vector decision unit 503, the motion vector compensation unit 507 performs research of ±2 or ±1 (pixel unit) or refinement of half pixel unit. The motion vector compensation unit 507 can perform more accurate refinement as the motion vector compensation unit 507 performs the refinement with broader search area.

Except where the odd field of the output macro block is based on the even field of the reference frame, or the even field of the macro block is based on the odd field of the reference frame, the compensation by the motion vector decision unit 503 is not needed. In the case of 0.5 scaling process, a frame motion vector of the input macro block that has not been scaled may be calculated by mathematical expression (7).

$$dec\_MV[0][s][t] = [(dec\_MV[0][s][t] + dec\_MV[1][s][t])/2 + 0.5] \quad (7)$$

Here, dec_MV is the motion vector that has not been scaled. The motion vector decision unit 501 can calculate a final reference motion vector as the motion vector decision unit 501 substitutes the calculated value by the mathematical expression (7) for mathematical expression (4), when the picture quality preference command is input.

Mathematical expressions (8a) and (8b) are used to calculate the motion vector (MVx, MVy) of a kth macro block in a block based motion estimation.

$$(MVx, MVy) = \arg\min(m, n) \in S \; SADk \, (m, n) \quad (8a)$$

$$SAD_k(m, n) = \sum_{i=0}^{15} \sum_{j=0}^{15} \left| F_{ij} - F^R_{i+m, j+n} \right| \quad (8b)$$

where:
  m and n are respectively a horizontal element and a vertical element of the motion vector,
  the value of the motion vector (MVx, MVy) is within the search area S, Fij is a luminance value of i row and j column,
$F^R$i+m, j+n is a luminance value of the reference frame/field, and
SAD is a sum of an absolute difference.

When the search area of the motion vector is ±sx in a horizontal direction and ±sy in a vertical direction, and the mathematical expressions 8a and 8b are a cost function, the motion estimation computational requirement of one macro block is (2sx+1)+(2sy+1).

According to the transcoder of the present invention, where the input bit stream is an interlaced video and a frame picture, a value needed to decide the mode of the macro block in one frame/field does not need to be computed with respect to all of: the reference frame and the current frame, the even fields of the reference frame and the current frame, the odds fields of the reference frame and the current frame, the even field of the reference frame and the odd field of the current frame, and the odd field of the reference frame and the even field of the current frame, as in a conventional computation method. In other words, the transcoder according to the present invention does not have to repeat the computational process to decide the mode and the motion vector of the macro block, and the computational requirements are remarkably reduced.

TABLE 1

| Reference Area | Computational requirements |
|---|---|
| frame to frame | (2sx + 1) × (2sy + 1) × h × v |
| top field to top field | [(2sx + 1) × (2sy + 1) × h × v]/2 |
| top field to bottom field | [(2sx + 1) × (2sy + 1) × h × v]/2 |
| bottom field to top field | [(2sx + 1) × (2sy + 1) × h × v]/2 |
| bottom field to bottom field | [(2sx + 1) × (2sy + 1) × h × v]/2 |

Table 1 shows the computational requirements to compute the motion vector according to the reference area, where h is a horizontal size of an image, and v is a vertical size of the image.

The relation of search area of horizontal sx and vertical sy of a conventional "full search" method and the horizontal sx' and vertical sy' of the motion vector of the present invention is sx=$a_x$sx' and sy=$a_y$sy', where $a_x$ and $a_y$ are constants. An amount of calculation required to obtain the motion vector may be expressed as mathematical expression (9).

$$(2sx+1) \times (2sy+1) \times h \times v + 4 \times 1/2 \times (2sx+1) \times (2sy+1) \times h \times v \quad (9)$$

Rearranging the mathematical expression (9) gives mathematical expression (10), $$3 \times (2sx+1) \times (2sy+1) \times h \times v \quad (10)$$

To identify a difference between an amount of the calculation required by the conventional 'full search' method and an amount of calculation required by the present invention, it may be assumed that the sx=sy, and sx is substituted for $a_x$sx'. Then, it gives $3 \times (4a_x sx'^2)$ as the computational requirements according to the 'full search' method. That is, the $3 \times (4a_x sx'^2)$ is obtained from the expression 10 as the term of highest order is regarded as a significant value. On the other hand, the computational requirements by the transcoder of the present invention becomes $(4sx'^2)$, which is obtained from the computational requirements of $(2sx+1) \times (2sy+1)$ according to the Expression 8 as the term of highest order is regarded as a significant value.

To compare the capability of the present invention and the conventional method, standard CCIR 6 MPEG-2 test images of table tennis (450 frames), mobile & calendar (135 frames), and football (60 frames), which are generally used for image processing, are used. The table tennis image is used to estimate a relatively simple motion, the mobile and calendar images are used to estimate a complicated motion, and the football image is used to estimate a rapid motion. The images are encoded as respective 704×480 i frame pictures and 6 Mbps MPEG-2 bit streams. Tables 2 and 3 show comparative data for a re-encoding mode method, a full search mode method, and a fast mode method according to the present invention. CPU time (seconds) required for the motion estimation is shown in Table 2 and PSNR (peak signal-to-noise ratio) is shown in Table 3. Results of the mode & full search MV method are included to compare the mode decision of the macro block and the conventional re-encoding method. The motion vector is computed by using the full search method used for the re-encoding method.

TABLE 2

| | | CPU time | | |
|---|---|---|---|---|
| | Scale | Re-encoding | Mode & full search MV | Fast Mode |
| Table tennis | 0.75 | 86.85 | 35.74 | 10.11 |
| | 0.5 | 33.98 | 14.54 | 4.67 |
| | 0.375 | 17.66 | 7.6 | 2.61 |
| Mobile & Calendar | 0.75 | 75.45 | 29.83 | 9.96 |
| | 0.5 | 31.07 | 12.52 | 4.32 |
| | 0.375 | 15.48 | 6.47 | 2.52 |
| Football | 0.75 | 88.69 | 38.44 | 9.55 |
| | 0.5 | 38.78 | 17.08 | 4.29 |
| | 0.375 | 21.58 | 9.61 | 2.74 |

TABLE 3

| | | PSNR | | |
|---|---|---|---|---|
| | Scale | Re-encoding | Mode & full search MV | Fast Mode |
| Table tennis | 0.75 | 38.143 | 38.014 | 37.761 |
| | diff. | 0 | −0.129 | −0.382 |
| | 0.5 | 36.554 | 36.421 | 36.191 |
| | diff. | 0 | −0.133 | −0.363 |
| | 0.375 | 37.735 | 37.485 | 37.356 |
| | diff. | 0 | −0.25 | −0.379 |
| Mobile & Calendar | 0.75 | 33.502 | 33.22 | 33.244 |
| | diff. | 0 | −0.282 | −0.258 |
| | 0.5 | 31.2 | 30.927 | 30.974 |
| | diff. | 0 | −0.273 | −0.226 |
| | 0.375 | 33.009 | 32.826 | 32.861 |
| | diff. | 0 | −0.183 | −0.148 |
| Football | 0.75 | 34.894 | 34.582 | 34.578 |
| | diff. | 0 | −0.312 | −0.316 |
| | 0.5 | 32.24 | 32.02 | 31.919 |
| | diff. | 0 | −0.203 | −0.304 |
| | 0.375 | 32.38 | 32.131 | 31.963 |
| | diff. | 0 | −0.249 | −0.417 |

Figure 8:
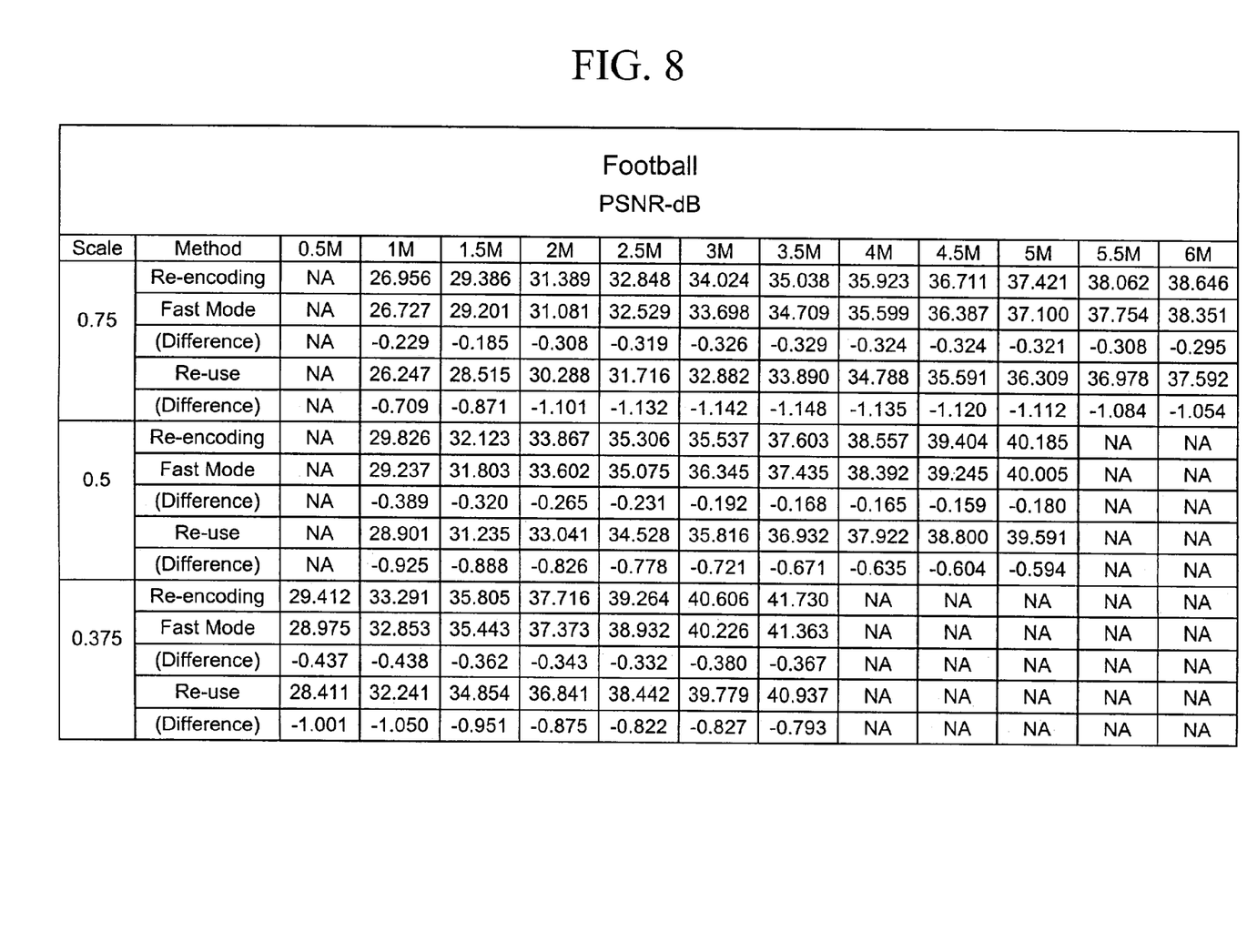
FIG. 8 shows an average PSNR with respect to a Y element of a result of a scaled football image.
Figure 9:
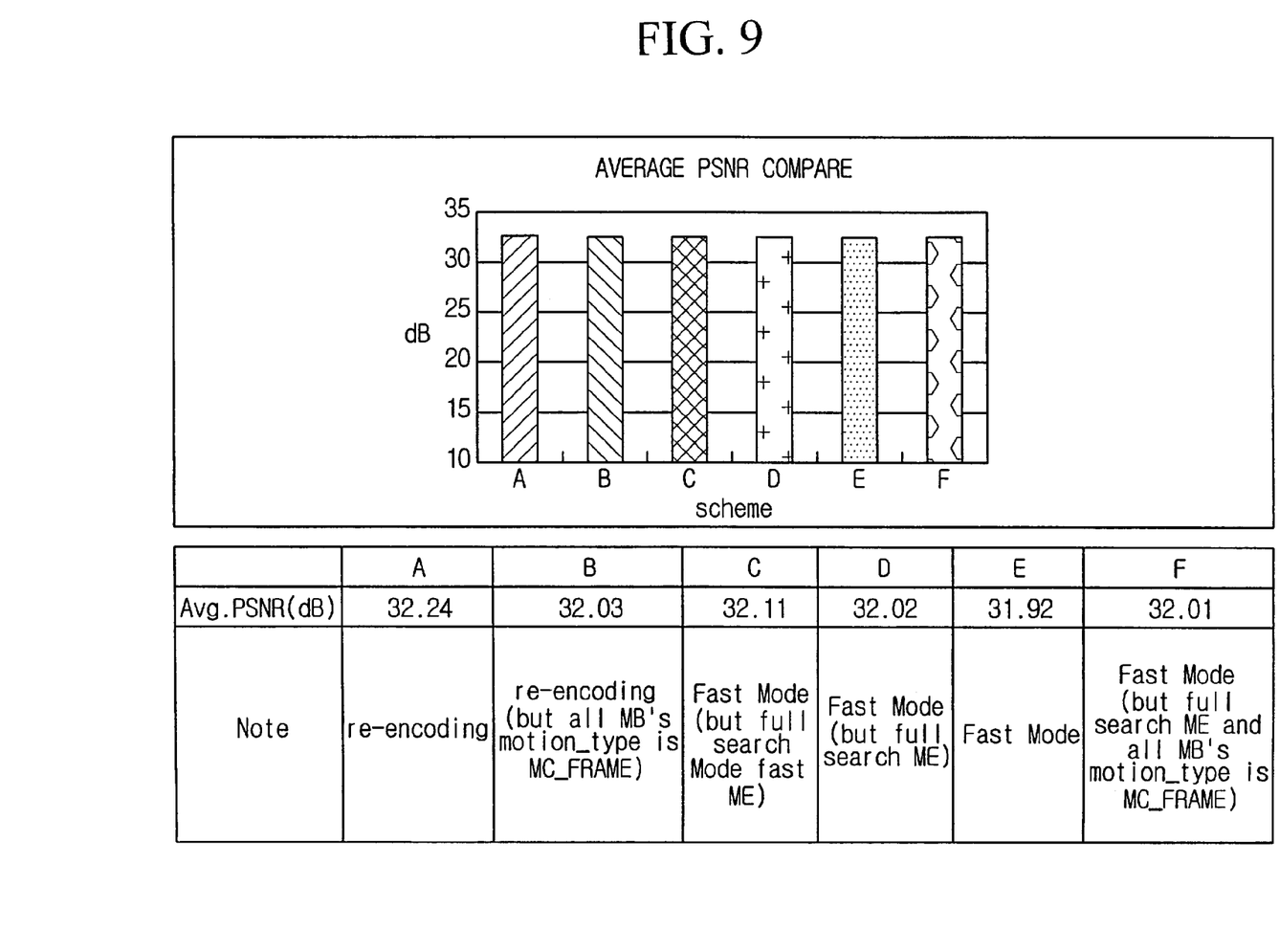
FIG. 9 is a view showing a comparison result of an average peak signal to noise ratio between a method according to the present invention and a conventional re-encoding or transcoding method.

FIG. 8 is a table which shows an average PSNR in units of decibels (db) with respect to the football image. Comparative values for scales of 0.75, 0.5 and 0.375 for each of the re-encoding method, the fast mode (present invention) method and a re-use method. Difference values are shown for each of the scales. One set of difference values for each scale compares the fast mode method and the re-encoding method and the other set of difference values for each scale compares the re-use method and the re-encoding method for each scale. The PSNR values shown in the table of FIG. 8 are determined with respect to a Y element of a result of the football image that has been scaled with the scales of 0.75, 0.5 and 0.375 and transcoded from 6 Mpbs to 1.5 Mbps. The Y element indicates a luminance that serves as a parameter used in the MPEG method. Also, the comparison result of an average PSNR between a method of the present invention and a conventional re-encoding method is illustrated in FIG. 9.

As described above, according to the transcoder of the present invention, a picture quality which is almost the same as the input frame may be encoded and the computational requirements are remarkably reduced compared with the conventional motion estimation method.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A transcoder comprising:
a scaler which scales an input image and receives motion vectors of macro blocks of an input bit stream;
a mode decision unit which decides a mode of a macro block of an output bit stream based on an area of a scaled macro block of a reference frame overlapped with the macro block of the output bit stream among input macro blocks and a mode of the overlapped macro blocks; and
a motion vector decision unit which decides a reference motion vector of the output macro block based on motion vectors of the overlapped macro blocks.

2. The transcoder of claim 1, wherein:
the mode decision unit multiplies respective areas of the overlapped macro blocks and respective weight values corresponding to the respective overlapped macro blocks, and decides the mode of the output macro block as an intra when a sum of the multiplied values is above a predetermined value, wherein
the respective weight value is a ratio of the area of the respective overlapped macro block to an entire area of the scaled macro block.

3. The transcoder of claim 2, wherein the mode decision unit comprises a motion type decision unit which decides a motion type of the output macro block based on a motion type of the input macro block.

4. The transcoder of claim 3, wherein the motion type decision unit decides the motion type of the output macro block as a field, when the motion types of the overlapped macro blocks are all fields and values of the motion vectors corresponding to the respective fields are all the same.

5. The transcoder of claim 4, wherein the motion vector decision unit decides a reference motion vector of the output macro block by a mathematical expression:

$$BMV_i = \sum_{m=0}^{M} MV_m w_m \times sf$$

where:
'$BMV_i$' is an ith reference motion vector of the output macro block,
i=0, 1, . . . MB_horizontal size×MB_vertical size−1,
'$MV_m$' is an mth motion vector with respect to the overlapped macro block,
'sf' is a value for deciding a size (0<sf<1) of an image of an output bit stream,
"$w_m$" is a weight value with respect to the mth motion vector, and
'MB' is an area of the overlapped macro block.

6. The transcoder of claim 1, further comprising:
a picture quality preference mode selection unit which receives a picture quality preference command; and
a motion vector compensation unit which compensates the motion vector of the output macro block based on the decided reference motion vector, when the picture quality preference command is received.

7. The transcoder of claim 6, wherein the motion vector compensation unit adds a predetermined value to an even field motion vector, when the even field motion vector of the output macro block is based on an odd field motion vector of the reference frame, in the case that the motion type of the output macro block is decided as the field.

8. The transcoder of claim 6, wherein the motion vector compensation unit subtracts a predetermined value from an odd field motion vector, when the odd field motion vector of the output macro block is based on the even field motion vector of the reference frame, in the case that the motion type of the output macro block is decided as the field.

9. A method of transcoding, comprising:
receiving motion vectors of macro blocks of an incut bit stream from a scaler which scales an input image;
deciding a mode of a macro block of an output bit stream based on an area of a scaled macro block of a reference frame overlapped with the macro block of the output bit stream among input macro blocks and a mode of the overlapped macro blocks; and
deciding a reference motion vector of the output macro block based on motion vectors of the overlapped macro blocks.

10. The method of claim 9, wherein:
the deciding of the mode comprises multiplying respective areas of the overlapped macro blocks and weight values corresponding to the respective overlapped macro blocks, wherein, where the proportion of an intra in a summation of resultant values of the multiplying is above a predetermined value,
the mode of the output macro block is decided as the intra, and
the weight value is an area ratio of the respective overlapped macro block with respect to an entire area of the input macro block.

11. The transcoding method of claim 10, wherein the deciding of the mode further comprises deciding a motion type of the output macro block based on a motion type of the input macro block.

12. The transcoding method of claim 11, wherein, in the deciding of the motion type, the motion type of the output macro block is decided as the field, where the motion types of the overlapped macro blocks are all fields and values of the motion vectors corresponding to the respective fields are the same.

13. The transcoding method of claim 12, wherein, in the deciding of the motion vector, a reference motion vector of the output macro block is decided by a following mathematical expression based on the area ratio of the macro block overlapped with the reference frame among the input macro blocks and the motion vector:

$$BMV_i = \sum_{m=0}^{M} MV_m w_m \times sf$$

where:
- $BMV_i$ is an ith reference motion vector of the output macro block,
- i=0, 1, . . . MB_horizontal size×MB_vertical size−1,
- $MV_m$ is an mth motion vector with respect to the overlapped macro block,
- sf is a value for deciding a size (0<sf<1) of an image of an output bit stream, and
- MB is an area of the overlapped macro block.

14. The method of claim 9, further comprising:
receiving an input picture quality preference command; and
compensating the motion vector of the output macro block based on the decided reference motion vector, where the picture quality preference command is received.

15. The method of claim 14, wherein in the compensating of the motion vector, a predetermined value is added to an even field motion vector, where the even field motion vector of the output macro block is based on an odd field motion vector of the reference frame, in the case that the motion type of the output macro block is decided as the field.

16. The transcoding method of claim 14, wherein, in the compensating of the motion vector, a predetermined value is subtracted from an odd field motion vector, where the odd field motion vector of the output macro block is based on the even field motion vector of the reference frame, in the case that the motion type of the output macro block is decided as the field.

* * * * *

UNITED STATES PATENT AND TRADEMARK OFFICE
CERTIFICATE OF CORRECTION

PATENT NO. : 7,245,661 B1  Page 1 of 1
APPLICATION NO. : 10/320528
DATED : July 17, 2007
INVENTOR(S) : Tae-hee Kim et al.

It is certified that error appears in the above-identified patent and that said Letters Patent is hereby corrected as shown below:

Column 11, Line 61, Claim 4, change "BMVi." to --BMVi--.

Column 11, Line 63, Claim 4, before "MB" insert --,--.

Column 12, Line 24, Claim 8, change "incut" to --input--.

Column 13, Line 12, Claim 14, before "MB" insert --,--.

Signed and Sealed this

Fourth Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,245,661 B2  Page 1 of 1
APPLICATION NO. : 10/320528
DATED : July 17, 2007
INVENTOR(S) : Tae-hee Kim et al.

It is certified that error appears in the above-identified patent and that said Letters Patent is hereby corrected as shown below:

Column 11, Line 61, Claim 5, change "BMVi." to --BMVi--.

Column 11, Line 63, Claim 5, before "MB" insert --,--.

Column 12, Line 24, Claim 9, change "incut" to --input--.

Column 13, Line 12, Claim 13, before "MB" insert --,--.

This certificate supersedes the Certificate of Correction issued December 4, 2007.

Signed and Sealed this

Thirteenth Day of May, 2008

JON W. DUDAS
*Director of the United States Patent and Trademark Office*